United States Patent [19]

Alvord et al.

[11] 4,321,512
[45] Mar. 23, 1982

[54] REGULATED VIDEO DISPLAY TERMINAL POWER SUPPLY

[75] Inventors: Robert J. Alvord, Chicago; Gregory J. Beaumont, Arlington Heights; Richard J. Steinmetz, Elk Grove Village, all of Ill.

[73] Assignee: Zenith Radio Corporation, Glenview, Ill.

[21] Appl. No.: 179,328

[22] Filed: Aug. 18, 1980

[51] Int. Cl.³ .............................................. H01J 29/70
[52] U.S. Cl. ...................................... 315/411; 358/190
[58] Field of Search ................. 315/411, 408; 358/190

[56] References Cited

U.S. PATENT DOCUMENTS 3,629,497 12/1971 Soardi .
3,641,267 2/1972 Cavallari .
3,818,128 6/1974 Chambers et al.
4,215,296 7/1980 Mitamura et al. .................. 315/411

Primary Examiner—Theodore M. Blum

[57] ABSTRACT

Disclosed is a power supply having transformer isolation which is capable of providing a plurality of precisely regulated output voltage levels. This regulated power supply is particularly adapted for use in a video display terminal because the output voltages may be scan-derived for improved video presentation with a plurality of precise voltage levels for driving various terminal logic levels provided by a single DC signal source.

9 Claims, 5 Drawing Figures

REGULATED VIDEO DISPLAY TERMINAL POWER SUPPLY

BACKGROUND OF THE INVENTION

This invention relates generally to regulated power supplies, and particularly relates to a power supply for use in a video display terminal.

A typical video display terminal includes a power supply, a monitor, a keyboard and logic circuitry. The user provides inputs via the keyboard and receives visual feedback from the monitor. The power supply generally energizes all video terminal components and the digital logic circuitry permits the terminal to operate with various other systems including a digital computer.

Prior art video display terminal power supplies are generally either of the linear regulator type or of the switch mode type. A linear regulator typically generates many B+ voltages from a power transformer and provides linear regulation for each of these B+ voltages. This approach is expensive because of the potentially large number of regulators required and is inefficient from a power utilization standpoint. In addition, the large power transformer required generates a substantial amount of heat which must be eliminated and the inductive leakage of this large transformer can easily degrade video imagery. The other approach to energizing a video display terminal involves a switching mode power supply in which a single voltage regulator is used with various conductive modes selectively switched in to provide various DC output signals. The problem with this approach is that the switching of all of the non-linear regulators occurs during the video display time interval producing display distortions during switching periods. From a more practical standpoint, in the past the video display terminal designer was required to integrate the power supply with the other terminal components which involved both analog and digital design considerations. With some terminal components being primarily digital in nature and others primarily analog, this lack of a systems integration approach in video display terminal design added to their complexity, cost and limited flexibility in meeting a wide variety of applications.

U.S. Pat. No. 3,818,128 to Chambers et al discloses a switching mode power supply which claims to eliminate undesirable interference of the power supply with the display system by operating the power supply at a substantially higher frequency than the line sweep frequency and which is synchronized therewith so that the power supply operates at a harmonic of the sweep frequency. By thus synching the video display power supply frequency with the display logic so that power switching occurs only during intercharacter time intervals any noise spike produced occurs during an intercharacter time interval when the cathode ray tube is blanked thus eliminating interference with the display since switching never occurs during display time. While this invention reduces switching mode video display interference, it is designed to operate at extremely high frequencies, i.e., between 1 and 100 kilohertz, and is too complex and costly for the typical video display terminal installation. This system is also limited to the display of white letters on a black background to avoid switching during video display "on" time.

Another approach to video display power supply design is disclosed in U.S. Pat. No. 3,641,267 to Cavallari wherein is described a power supply designed for stepping down an AC or DC input source to a stable DC output level. In this power supply a chopper circuit incorporating one or more normally blocked transistors is inserted between the input circuit and a load circuit. Voltage stabilization of the output signal is achieved by incorporating a voltage-limiting means such as a Zener diode in the input circuit which limits the amplitude of the pulsed output of the input transistor and hence the voltage level of the power supply output signal. With a transformer incorporated in the network and the Zener diode coupled to a secondary winding of the transformer the current flowing through the primary winding will be controlled by the Zener in that excess secondary current is dissipated through the Zener diode connected between the base and the emitter of the associated transistor. The Cavallari invention is intended primarily to permit a large variety of DC level output signals to be produced from large variations in the AC or DC input voltage level and is not designed to improve video display quality by synchronization techniques or precise output voltage level regulation. Still another video display power supply is disclosed in U.S. Pat. No. 3,629,497 to Soardi et al which is limited to generating a low voltage DC output signal.

The present invention is intended to avoid the aforementioned computer terminal and video display power supply problems by providing an isolated, well-regulated, source of low impedance DC output signals which are synchronized with video display sweep circuitry and which can be used to drive various video display logic levels and computer terminal subsystems.

OBJECTS OF THE INVENTION

Accordingly, it is an object of the present invention to provide an improved power supply for generating a plurality of precisely regulated output voltage signals.

It is another object of the present invention to provide an improved power supply for use in a video display terminal capable of providing a plurality of precisely regulated voltage level signals without degrading video image display quality.

Still another object of the present invention is to provide an improved power supply affording a high level of isolation between input and output stages.

Still another object of the present invention is to provide an improved power supply for a video display terminal capable of converting a single input voltage level to a plurality of precisely regulated, scan-and/or pulse-derived output voltage levels.

A still further object of the present invention is to provide a single power supply for a video display terminal capable of driving a video display with a minimum of video image degradation while affording a high degree of isolation between the input line voltage source and the video display terminal.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings in which:

DESCRIPTION OF THE PREFERRED EMBODIMENTS

Figure 1:
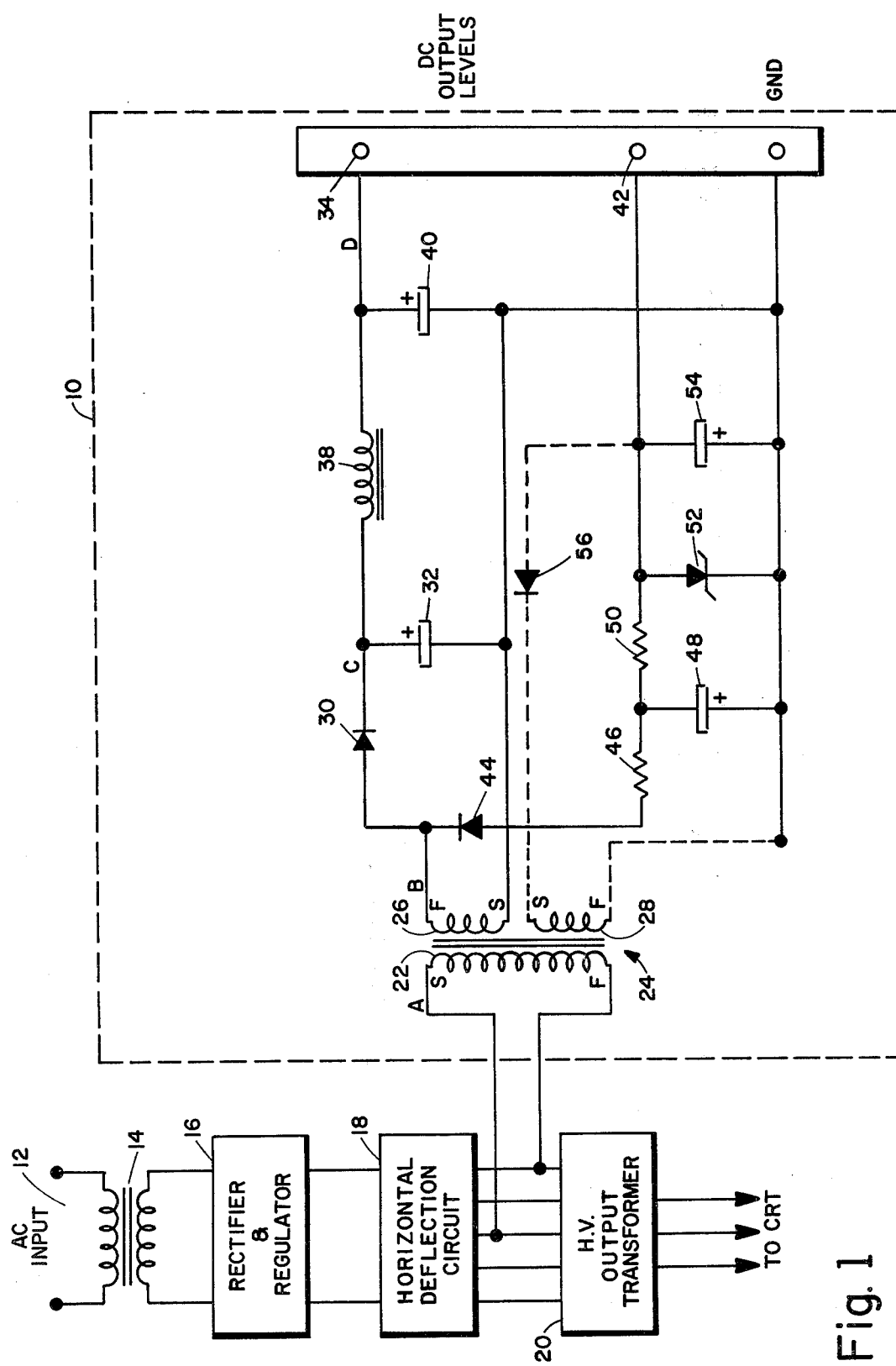
FIG. 1 shows a simplified circuit diagram of a regulated video display terminal power supply in accordance with a preferred embodiment of the present invention.

Referring to the circuit diagram of FIG. 1 there is shown a regulated power supply 10 which is especially adapted for use in a video display terminal having a monitor in accordance with a preferred embodiment of the present invention. Typically, a utility-provided AC input 12 is available for energizing the display terminal. This input line generally provides 120 or 240 VAC at 50 or 60 Hz. The input voltage is provided to step-down transformer 14 which reduces the input voltage to approximately 20 VAC. Rectifier and regulator circuitry 16 then converts the AC input to a regulated DC output voltage of approximately 15 VDC. This DC voltage is then provided to deflection circuitry 18 of the video display (not shown). The horizontal deflection circuit 18 oscillates at a very high frequency and energizes the high voltage output transformer 20. The high voltage output transformer 20, in turn, supplies voltage to the video display's cathode ray tube (CRT). It is to be noted here that the system configuration thus far discussed is intended to be general in nature and not to place limitations on the present invention. What has been described thus far is the power supply chain to a typical video display operated from a standard 120 VAC, 60 Hz line. The numbers assigned are intended merely for descriptive purposes in describing the preferred embodiments of the present invention and are not intended to limit the scope or definition of the present invention.

Figure 2A:
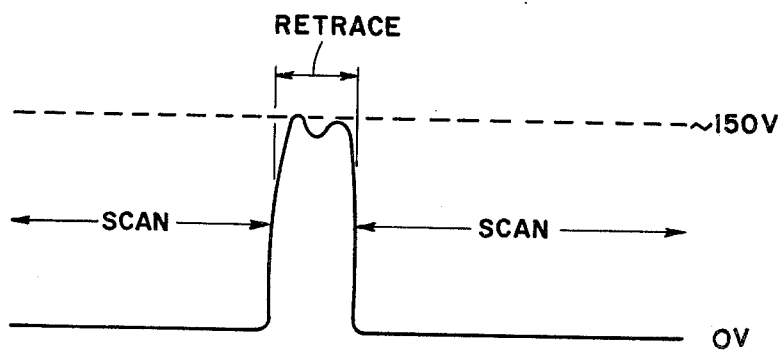
FIGS. 2A-2D show a set of waveforms indicating the voltage at several points in the regulated video display terminal power supply shown in FIG. 1, with the several points designated by letters corresponding to the respective figures.
Figure 2B:
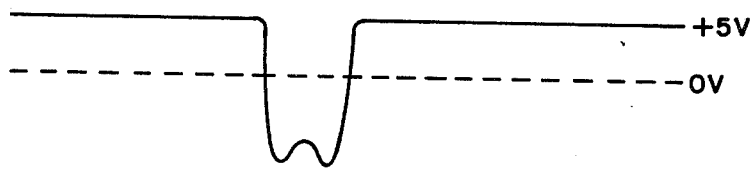

In accordance with the present invention, the primary winding 22 of transformer 24 is coupled to the output of horizontal driver 18. One side of primary coil 22 is connected to the horizontal output transistor voltage (approximately 150 V) while the other side is coupled to a +15 V output from rectifier and regulator circuit 16. Secondary coil 26 is inductively coupled to primary coil 22 with the number of turns and direction of secondary coil 26 relative to the number of turns and direction of primary coil 22 determining the magnitude and polarity of the output voltages of transformer 24. As shown in FIG. 1, secondary coil 26 is wired such that its start and finish portions cause the flyback pulse to be inverted and a +5 output voltage signal during scan to be produced. This reduced voltage level also indicates that secondary coil 26 includes a proportionately fewer number of turns than primary coil 22. A tertiary coil 28 is also shown and will be discussed in detail later, but the present invention is not limited to the use of one or two secondary coils, but may accommodate any number of secondary coils depending on the particular application involved. Thus, transformer 24 performs the functions of reducing the magnitude of the input voltage level from 150 V to 50 V and inverting the input signal to provide a positive 5 V output during the horizontal scan portion of CRT deflection. FIG. 2A shows the input signal provided to primary coil 22 while the output signal of secondary coil 26 is shown in FIG. 2B. Transformer 24 thus converts the regulated +150 V retrace pulse to a regulated reduced voltage negative pulse.

Figure 2C:
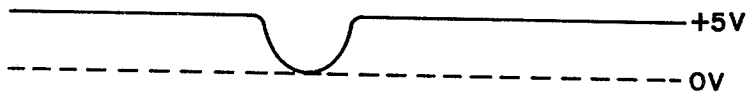

The AC signal output of secondary coil 26 is rectified by means of diode 30 and capacitor 32. Diode 30 is rendered conducting when a potential of at least 0.7 V is applied across it. Thus, during horizontal scan diode 30 is in a conducting state and charges capacitor 32 which is coupled between the cathode of diode 30 and ground. When conducting, diode 30 delivers an output voltage to terminal 34 and when not conducting, the discharge of capacitor 32 provides for the DC output signal at terminal 34. With a flyback pulse width of 10 microseconds or less and a total sweep period of 70 microseconds or less, the size of capacitor 32 may be kept quite small because of the short discharging period. FIG. 2C shows the rectified voltage waveform at the output of diode 30 which, in combination with the discharge of capacitor 32, provides a level DC output to terminal 34. The voltage level of this DC signal depends upon the input signal voltage level at primary coil 22 and the number of turns in secondary coil 26 relative to the number of turns in primary coil 22. The phase of this output signal is determined by the polarity of secondary coil 26 relative to that of primary coil 22.

Figure 2D:
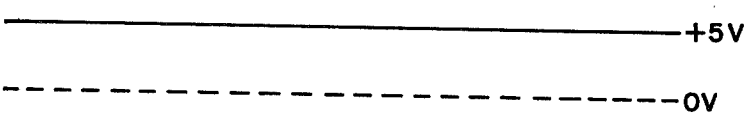

Coil 38 and capacitor 40 act in combination as a high frequency filter so that the output DC voltage is maintained within ±50 millivolts of the 5 V output voltage of diode 30 and discharging capacitor 32 as shown in FIG. 2(D). Again, because the system is operating at a frequency of either 15 kilohertz or more, depending upon the horizontal deflection rate of the particular video display involved, small component values and sizes may be used in the present invention. Thus, it can be seen that the present invention provides well-regulated DC output voltages of either polarity using only a minimal number of passive devices without utilizing any extra active devices which add to power supply complexity and cost. In addition, the diode switching involved in producing the level DC output voltage occurs during the retrace portion of horizontal sweep thus avoiding spurious inputs during horizontal scan and video image distortions associated therewith. Thus, the DC output signal provided to terminal 34 is a scan-derived voltage.

In the present invention the scan-derived voltage delivered to terminal 34 is complemented with a pulse-derived voltage provided to terminal 42 by means of diode 44 and associated circuitry. Diode 44 is coupled between secondary winding 26 and the anode of diode 30 and is rendered conducting when the voltage thereacross exceeds 0.7 V. The anode of diode 44 is coupled to ground through the resistor, capacitor and a Zener diode combination shown in FIG. 1. When the voltage between secondary coil 26 and diode 30 goes below −0.7 V during retrace, diode 44 is rendered conducting. Thus, diode 44 is off during the scan portion of horizontal deflection and is turned on during retrace. Because of the short duration of retrace diode 44 conducts for only a short period of time and produces a high voltage pulse of approximately −50 V. Resistor 46 reduces this −50 V pulse to approximately −30 V in charging up capacitor 48. Storage of this voltage is provided by the discharge of capacitor 48 when diode 44 is in a non-conducting state and regulation and filtering of the negative output voltage applied to terminal 42 is accomplished by means of resistor 50, Zener diode 52 and filter capacitor 54. Voltage regulation is accomplished primarily by means of Zener diode 52. Incorporation of Zener diode 52 minimizes voltage swings and permits a more level DC output voltage at terminal 42 with varying loads. Resistor 50 reduces the −30 V applied across resistor 46 which is generated by the discharge of capacitor 48 to approximately −12 V. Zener diode 52 is selected so that it turns on at −12 V which provides for precise regulation of the voltage applied to terminal 42. Thus, a −12 V level voltage is applied to terminal 42 with capacitor 54 providing filtering action for the output voltage. Thus, this output DC voltage is pulse-derived, or originates from the horizontal drive circuit retrace pulse.

Shown in dotted line form in FIG. 1 is a tertiary coil 28 which if incorporated in the circuit as shown in FIG. 1 will provide the same output signal as provided by Zener diode 52. The polarity of tertiary coil 28 is the same as primary coil 22 as indicated by the S(start) and F(finish) positions in FIG. 1. As shown in FIG. 1, the polarity of secondary coil 26 is reversed from that of primary coil 22. With tertiary coil 28 incorporated in the present invention and Zener diode 52 and associated connections removed, a −12 V scan voltage may be delivered to diode 56 upon the proper selection of turns in tertiary coil 28 relative to the number of turns in primary coil 22. Similarity of polarity between primary coil 22 and tertiary coil 28 will ensure that a negative scan voltage is provided to diode 56 and that diode 56 will produce a −12 V DC output on capacitor 54 as can be seen in FIG. 1. The incorporation of tertiary coil 28 permits the removal of diode 44, resistor 46, resistor 50, capacitor 48 and Zener diode 52 and thus represents another embodiment of the present invention.

There has thus been shown a power supply for use in a video display terminal which offers the advantages of small size, excellent voltage regulation by means of a single regulation device and a high degree of isolation between input and output stages. The power supply of the present invention permits any number of regulated DC voltages to be generated for the various logic and monitor requirements of the video display terminal without creating unwanted spurious interference.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A DC power supply for use in a video display terminal in which said terminal is energized by a plurality of level DC voltages, said terminal having a monitor including a high voltage transformers energized with AC power from a horizontal output power source, said power supply comprising:
    signal inversion/level shifting means coupled in parallel with said high voltage transformer to said horizontal output power source for receiving horizontal deflection signals and for inverting said horizontal deflection signals and generating a plurality of output signals, each of said output signals being synchronous with said horizontal deflection signals and equal in voltage to a predetermined voltage level;
    a plurality of first rectification means coupled to said signal inversion/level shifting means for receiving and rectifying each of said output signals; and
    filter means coupled to each of said rectification means for receiving said rectified signals and generating a plurality of low impedance, level voltage, DC outputs each having a voltage level equal to the average value of the rectified signals provided to each of said filter means, for energizing said monitor without switching distortion and for providing said plurality of DC outputs to said video display terminal.

2. A power supply as in claim 1 wherein said signal inversion/level shifting means comprises transformer means including a primary winding coupled to said horizontal output power source for receiving said horizontal deflection signals and a plurality of secondary windings each inductively coupled to said primary winding and connected to one of said rectification means and wherein the number of turns of each of said secondary windings relative to the number of turns of said primary windings establishes the voltage level of each of said output signals.

3. A power supply as in claim 2 wherein the polarity of some of said secondary windings is reversed relative to said primary winding so as to generate output signals having voltage levels opposite in sign to said horizontal deflection signals.

4. A power supply as in claim 1 wherein each of said first rectification means comprises a unidirectional conducting device, said unidirectional conducting devices being rendered conductive when said output signals exceed a predetermined voltage level and non-conductive when said pulsed output signals do not exceed said predetermined voltage level.

5. A power supply as in claim 4 wherein each of said unidirectional conducting devices is a switching diode means rendered alternately conducting and non-conducting by said output signals.

6. A power supply as in claim 1 wherein each of said filter means comprises a capacitor-inductor combination for filtering out of said output signals noise generated by horizontal scan-retrace switching.

7. A power supply as in claim 1 further comprising:
    switching means coupled to said signal inversion/level shifting means for receiving said output signals, said switching means being rendered conductive during the retrace portion of horizontal deflection time;
    second rectification means coupled to said switching means for receiving said retrace-derived output signals and for rectifying said retrace-derived output signals; and
    second filter means coupled to said second rectification means for receiving said rectified retrace-derived output signals and for generating low impedance, level voltage, DC outputs of opposite sign to said horizontal retrace pulses having a voltage level equal to the average value of said DC retrace-derived outputs.

8. An isolated DC power supply for use in a video display terminal having a monitor with a first high voltage transformer driven by a horizontal deflection circuit in generating a plurality of DC output voltages from a single horizontal deflection input signal provided by said horizontal deflection circuitry of said monitor, said power supply comprising:

second transformer means including a primary coil and a plurality of secondary coils inductively coupled to said primary coil and having a polarity opposite to the polarity of said primary coil, said primary coil being connected in parallel with said first high voltage transformer to said horizontal deflection circuitry for receiving said horizontal deflection sweep input signal and for producing an output signal in each of said secondary coils, said output signals being inverted with respect to said horizontal deflection input signal, synchronous with said horizontal deflection input signal and shifted a first predetermined voltage level from said horizontal deflection input signal, with said first predetermined voltage level shift being determined by the relative number of turns between said primary coil and respective secondary coil;

rectification means coupled to each of said secondary coils for receiving said output signals and for converting said signals to DC voltages, said rectification means including diode conducting means which are rendered conducting when said output signals exceed a second predetermined voltage level; and filter means coupled to each of said rectification means for receiving said DC voltages and for generating a low impedance, level voltage, DC output having a voltage level equal to the average value of the rectified signals provided to each of said filter means, for energizing said monitor with horizontal deflection synchronized signals and for providing a plurality of DC output voltages to said video display terminal.

9. An isolated DC power supply for use in a video display terminal having a monitor with a first high voltage transformer driven by a horizontal deflection circuit in generating a plurality of DC output voltages from a single horizontal deflection input signal provided by said horizontal deflection circuitry of said monitor, said power supply comprising:

second transformer means including a primary coil and a plurality of secondary coils inductively coupled to said primary coil and having a polarity opposite to the polarity of said primary coil, said primary coil being connected in parallel with said first high voltage transformer to said horizontal deflection circuitry for receiving said horizontal deflection input signal and for producing a scan-derived output signal in each of said secondary coils, said output signals being inverted with respect to said horizontal deflection input signal, synchronous with said horizontal deflection input signal and shifted a first predetermined voltage level from said horizontal deflection input signal, with said first predetermined voltage level shift being determined by the relative number of turns between said primary coil and respective secondary coil;

first rectification means coupled to each of said secondary coils for receiving said output signals and for converting said signals to a plurality of first DC voltages, said first rectification means including diode conducting means which are rendered conducting when said output signals exceed a second predetermined voltage level;

switching means coupled to one or more of said secondary coils for receiving said output signals, said switching means being rendered conductive during the horizontal retrace time and thus converting said output signals to retrace-derived output voltages;

second rectification means coupled to each of said switching means for receiving said retrace-derived output voltages and for converting said output voltages to a plurality of second DC voltages; and first filter means coupled to said first rectification means and second filter means coupled to said second rectification means for receiving said DC voltages and for generating a first DC output voltage synchronous with and of the same sign as said retrace pulse and a second DC output voltage of opposite sign to said horizontal deflection signal, respectively, for energizing said video display terminal.

* * * * *